(12) United States Patent
Jovicevic (10) Patent No.: US 10,604,107 B2
(45) Date of Patent: Mar. 31, 2020

(54) ADJUSTABLE BUCKLE ASSEMBLY

(71) Applicant: Nissan North America, Inc., Franklin, TN (US)

(72) Inventor: Niko Jovicevic, Ann Arbor, MI (US)

(73) Assignee: Nissan North America, Inc., Franklin, TN (US)

( * ) Notice: Subject to any disclaimer, the term of this patent is extended or adjusted under 35 U.S.C. 154(b) by 79 days.

(21) Appl. No.: 15/693,293

(22) Filed: Aug. 31, 2017

(65) Prior Publication Data

US 2019/0061681 A1 Feb. 28, 2019

(51) Int. Cl.
*B60R 22/20* (2006.01)
*B60R 22/18* (2006.01)

(52) U.S. Cl.
CPC .......... *B60R 22/206* (2013.01); *B60R 22/18* (2013.01); *B60R 2022/1806* (2013.01)

(58) Field of Classification Search
CPC .................. B60R 22/206; B60R 2022/1806
See application file for complete search history.

(56) References Cited

U.S. PATENT DOCUMENTS

| | | | |
|---|---|---|---|
| 4,239,260 A | 12/1980 | Hollowell | |
| 4,790,597 A | 12/1988 | Bauer et al. | |
| 4,873,772 A * | 10/1989 | Maher | A01D 82/00 34/60 |
| 5,529,381 A * | 6/1996 | Zhao | B60R 22/105 297/238 |
| 6,467,849 B1 * | 10/2002 | Deptolla | B60R 22/26 297/216.1 |
| 2004/0046382 A1 * | 3/2004 | Ball | B60R 22/1955 280/806 |

FOREIGN PATENT DOCUMENTS

| | | |
|---|---|---|
| DE | 3243550 A1 | 5/1984 |
| DE | 4032829 A1 | 5/1991 |
| DE | 4101977 C2 | 9/1999 |
| EP | 0318127 A2 | 5/1989 |
| FR | 2922483 B1 | 4/2010 |

* cited by examiner

*Primary Examiner* — Karen Beck
(74) *Attorney, Agent, or Firm* — Young Basile Hanlon & MacFarlane, P.C.

(57) ABSTRACT

A buckle assembly comprises a buckle base bracket including at least one buckle base bracket ramp stop and at least one buckle base bracket reset ramp, and a buckle adjustment assembly. The buckle adjustment assembly includes a buckle strap coupled to the buckle base bracket such that the buckle adjustment assembly is capable of moving linearly along the buckle base bracket, a buckle head attached to the buckle strap, and a position locking unit coupled to the buckle strap, the position locking unit including a locking cam configured to prevent the buckle adjustment assembly from moving toward the proximal end of the buckle base bracket, and engage with a ramp surface of the buckle base bracket reset ramp to over-rotate the locking cam into a disengaged position such that the buckle adjustment assembly is movable in the first linear direction.

18 Claims, 9 Drawing Sheets

ADJUSTABLE BUCKLE ASSEMBLY

TECHNICAL FIELD

This disclosure relates to seat belt technology, such as a seat belt buckle assembly that is adjustable.

BACKGROUND

Vehicles, such as, automobiles, planes, trains, buses, and the like, include safety equipment, such as seat belts. Seat belts may be adjustable to adapt to passenger variation. For example, a seat belt may include an adjustable belt portion connected to a latch plate or tongue that may detachably interface with a buckle portion that may be attached, or anchored, to the vehicle at fixed location, and which may have limited adjustability, which may limit passenger comfort. Therefore, a safe and comfortable seat belt assembly including an adjustable buckle assembly would be advantageous.

SUMMARY

Disclosed herein are implementations of a buckle assembly that is adjustable. Also disclosed herein is a method for adjusting a buckle assembly.

An aspect of the disclosed embodiments is a buckle assembly comprising a buckle base bracket including at least one buckle base bracket ramp stop and at least one buckle base bracket reset ramp, and a buckle adjustment assembly. The buckle adjustment assembly includes a buckle strap coupled to the buckle base bracket such that the buckle adjustment assembly is capable of moving linearly along the buckle base bracket between an extended position, at least one intermediary position, and a reset position. The buckle adjustment assembly includes a buckle head attached to the buckle strap, such that a proximal end of the buckle base bracket is proximal to the buckle head and a distal end of the buckle base bracket is distal from the buckle head. The buckle adjustment assembly includes a position locking unit coupled to the buckle strap, the position locking unit including a locking cam. The locking cam configured to engage with a stop surface of the buckle base bracket ramp stop to prevent the buckle adjustment assembly from moving in a first linear direction toward the proximal end of the buckle base bracket, engage with a ramp surface of the buckle base bracket ramp stop to rotate the locking cam such that the buckle adjustment assembly is movable in a second linear direction toward the distal end of the buckle base bracket, and engage with a ramp surface of the buckle base bracket reset ramp to over-rotate the locking cam into a disengaged position such that the buckle adjustment assembly is movable in the first linear direction.

Another aspect of the disclosed embodiments is a method for adjusting a buckle assembly comprising applying a compressing force to a buckle adjustment assembly of a buckle assembly to move the buckle adjustment assembly to an adjustment position, wherein the adjustment position is an extended adjustment position, an intermediate adjustment position, or a reset adjustment position. The buckle assembly includes a buckle base bracket including at least one buckle base bracket ramp stop and at least one buckle base bracket reset ramp, and the buckle adjustment assembly. The buckle adjustment assembly includes a buckle strap coupled to the buckle base bracket such that the buckle adjustment assembly is capable of moving linearly along the buckle base bracket to the extended adjustment position, the intermediate adjustment position, and the reset adjustment position, a buckle head attached to the buckle strap, such that a first end of the buckle base bracket is proximal to the buckle head and a second end of the buckle base bracket is distal from the buckle head, and a position locking unit coupled to the buckle strap. The position locking unit includes a locking cam configured to engage with a stop surface of the buckle base bracket ramp stop to prevent the buckle adjustment assembly from moving in a first linear direction toward the first end of the buckle base bracket, engage with a ramp surface of the buckle base bracket ramp stop to rotate the locking cam such that the buckle adjustment assembly is movable in a second linear direction toward the second end of the buckle base bracket, and engage with a ramp surface of the buckle base bracket reset ramp to over-rotate the locking cam into a disengaged position such that the buckle adjustment assembly is movable in the first linear direction. The method includes removing the compressing force from the buckle adjustment assembly to lock the buckle adjustment assembly in a target adjustment position.

Another aspect of the disclosed embodiments is a vehicle comprising a buckle base bracket attached to the vehicle at a first end of the buckle base bracket, the buckle base bracket including a buckle base bracket rivet proximal to the first end of the buckle base bracket, and a buckle adjustment assembly coupled to the buckle base bracket such that the buckle adjustment assembly is capable of moving linearly along the buckle base bracket to each adjustment position from a plurality of adjustment positions between the first end of the buckle base bracket and a second end of the buckle base bracket. The buckle adjustment assembly includes a buckle strap coupled to the buckle base bracket using a buckle strap rivet, a buckle head attached to the buckle strap, such that the second end of the buckle base bracket is proximal to the buckle head and the first end of the buckle base bracket is distal from the buckle head, and a position locking unit coupled to the buckle strap. The position locking unit includes a locking cam, and a locking cam lock. The vehicle includes a compression spring, wherein the compression spring engages with the buckle base bracket rivet and the buckle strap rivet to bias the buckle adjustment assembly toward the first end of the buckle base bracket.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Limitations of the adjustability of seat belt assemblies, such as seat belt assemblies in vehicles, may affect the comfort and safety of passengers. For example, a seat belt may include an adjustable belt portion connected to a latch plate or tongue that may detachably interface with a buckle portion that may be attached, or anchored, to the vehicle at fixed location. In some vehicles the buckle portion may be attached to the vehicle such that the buckle portion may be rotated around a fixed axis (angular rotation) perpendicular to passenger orientation. In some vehicles the buckle portion may be attached to the vehicle such that the buckle portion may slide, such as along a track, parallel to passenger orientation (linear translation). Seat belt buckle assemblies that include angular rotation, linear translation, or both may limit passenger comfort and safety.

The adjustable buckle assembly described herein includes a buckle head attached to a buckle strap that is adjustably connected a buckle base bracket that is attached, or anchored, to the vehicle, which may improve passenger comfort and safety relative to seat belt buckle assemblies that are limited to angular rotation or linear translation.

Figure 1:
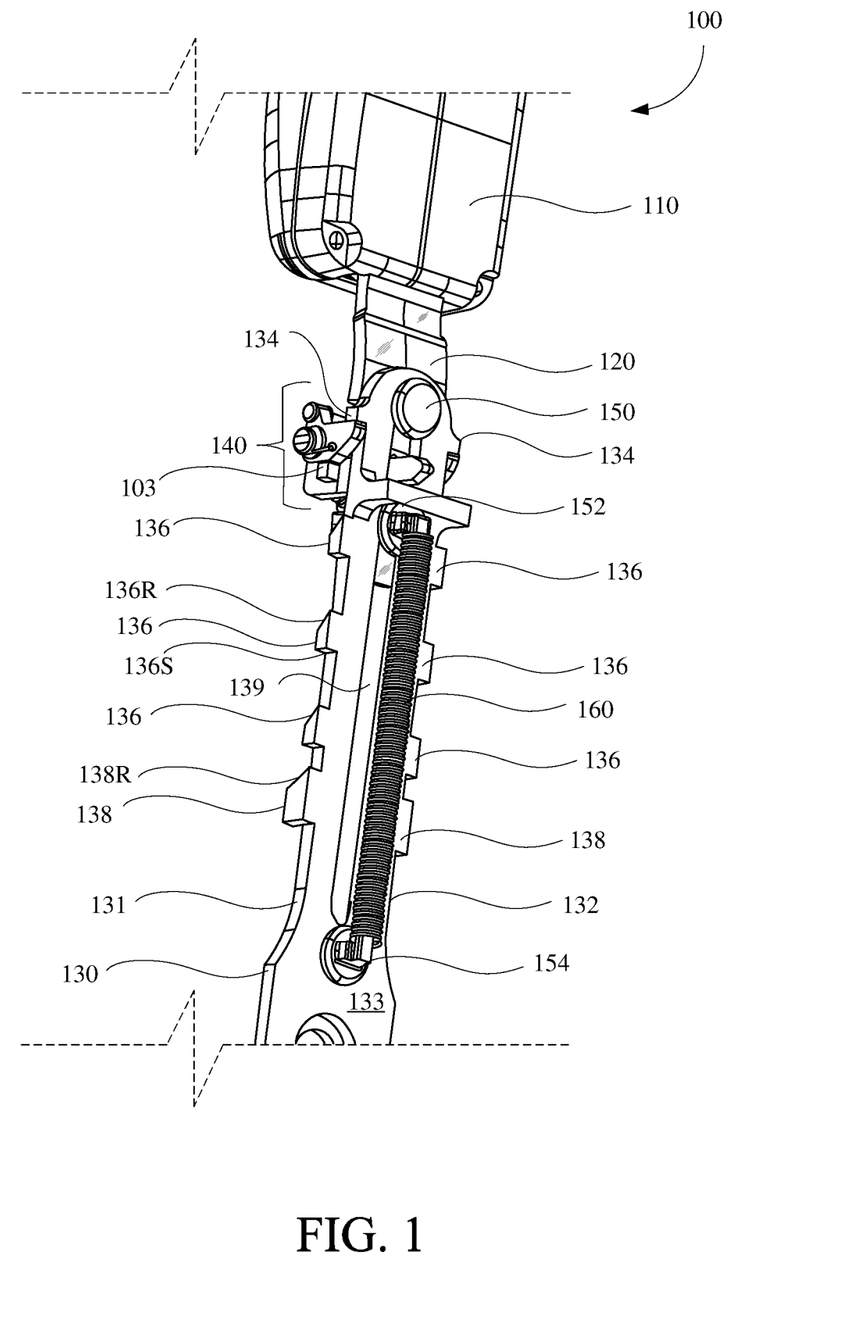
FIG. 1 is a perspective view of an example of a buckle assembly in accordance with implementations of this disclosure.

FIG. 1 is a perspective view of an example buckle assembly 100 in accordance with implementations of this disclosure. The buckle assembly 100 comprises a buckle head 110, a buckle strap 120, a buckle base bracket 130, and a position locking unit 140. The buckle head 110, the buckle strap 120, and the position locking unit 140 may be referred to herein as a buckle adjustment assembly. The buckle strap 120 is attached to the buckle head 110, the position locking unit 140, and the buckle base bracket 130.

Figure 2:
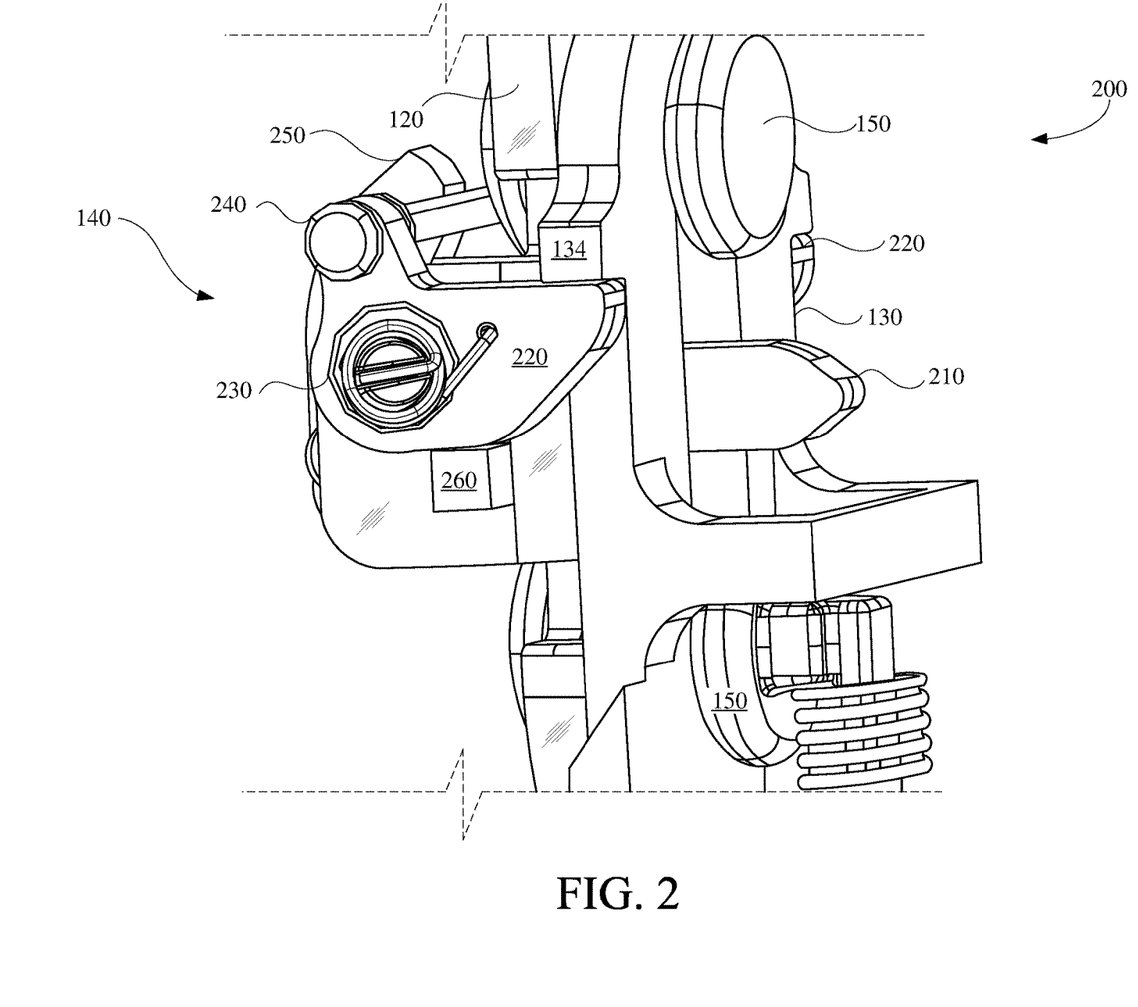
FIG. 2 is a zoomed in view of an example of a portion of the buckle assembly including the position locking unit shown in FIG. 1 in accordance with implementations of this disclosure.

The buckle strap 120 may be attached or fixed to the buckle head, and may be adjustably coupled, such as riveted, to the buckle base bracket 130. For example, the buckle strap 120 may be riveted to the buckle base bracket 130 using one or more buckle strap rivets 150, 152, such as shoulder rivets. The buckle strap rivets 150, 152 allow the buckle strap 120 to move linearly along the buckle base bracket 130, as described herein. Although the buckle strap 120 is shown in FIG. 2 as riveted to the buckle base bracket 130 using buckle strap rivets 150, 152, any device, unit, or configuration for attaching the buckle strap 120 to the buckle base bracket 130 such that the buckle strap 120 may move linearly along the buckle base bracket 130 may be used.

The buckle base bracket 130 may be attached, such as rotatably attached, to a vehicle. For example, buckle base bracket 130 may be attached to the vehicle at a first end, proximal to the buckle strap 120 in a reset position of the buckle assembly 100, and distal from a second end of the buckle base bracket 130, which may be proximal to the buckle strap 120 in an extended position of the buckle assembly 100, as shown.

The buckle base bracket 130 includes a first edge surface 131, a second edge surface 132, opposite the first edge surface 131, a first slide surface 133, and a second slide surface (not shown), opposite the first slide surface 133.

The buckle base bracket 130 includes one or more buckle base bracket stops 134, one or more buckle base bracket ramp stops 136, one or more buckle base bracket reset ramps 138, and a bracket gap 139. For example, the first edge surface 131 and the second edge surface 132 may include the buckle base bracket stops 134, the buckle base bracket ramp stops 136, and the buckle base bracket reset ramps 138 as shown. For simplicity and clarity, positionally aligned elements of the buckle assembly 100, such as a buckle base bracket ramp stops 136 of the first edge surface 131 and a corresponding buckle base bracket ramp stops 136 of the second edge surface 132 may be described herein using singular form.

A lower, such as distal from the buckle head 110, side or surface of the buckle base bracket stops 134 may engage with the position locking unit 140, or a portion thereof, to prevent the buckle head 110 and buckle strap 120 from extending beyond the extended position as shown.

Each of the buckle base bracket ramp stops 136 has a ramp surface 136R and a stop surface 136S. Each of the buckle base bracket ramp stops 136 may correspond with a respective intermediate adjustment position (linear height) for the buckle strap 120, allowing the height (position) of the buckle head 110 to be adjusted to a respective position corresponding to respective buckle base bracket ramp stops 136. For example, the buckle head 110 may be adjusted to an extended position as shown, a first intermediate position (not shown) corresponding to the buckle base bracket ramp stops 136 most proximate to the buckle base bracket stops 134, a second intermediate position (not shown) corresponding to the buckle base bracket ramp stops 136 second most proximate to the buckle base bracket stops 134, and a third intermediate position (not shown) corresponding to the buckle base bracket ramp stops 136 third most proximate to the buckle base bracket stops 134 and most proximate to the buckle base bracket reset ramps 138, which may be referred to herein as the compression position.

The buckle base bracket reset ramps 138 may be similar to the buckle base bracket ramp stops 136, except as described herein or otherwise clear from context. For example, The buckle base bracket reset ramps 138 may include a ramp surface 138R.

The buckle assembly 100 includes a compression spring 160 engaging the buckle base bracket 130 proximal to the compressed position, such as at a buckle base bracket rivet 154 and engaging the buckle strap 120 at a lower buckle strap rivet 152 to provide a biasing force pressing the buckle strap 120 towards the extended position.

The buckle assembly 100 may be adjusted, which may include adjusting the position of the buckle head 110, the buckle strap 120, and the position locking unit 140 relative to the buckle base bracket 130, by applying a compressing force to the buckle head 110 in a first linear direction (compression), toward the buckle base bracket reset ramps 138 or by resetting the buckle assembly 100 such that the buckle head 110, the buckle strap 120, and the position locking unit 140 move in a second linear direction (extension) towards the extended position and are prevented from extending further by the buckle base bracket stops 134.

Although three pairs of buckle base bracket ramp stops 136 are shown in FIG. 1, corresponding to three intermediate positions, any number or cardinality of pairs of buckle base bracket ramp stops 136 corresponding to a respective number or cardinality of intermediate positions may be used.

FIG. 2 is a zoomed in view of an example of a portion 200 of the buckle assembly 100 including the position locking unit 140 shown in FIG. 1 in accordance with implementations of this disclosure. The position locking unit 140 may be coupled to the buckle strap 120 and the buckle base bracket 130, and may include a reset link 210, one or more locking cams 220, locking cam springs 230, a locking cam link 240, and a locking cam lock 250.

The position locking unit 140 may include a single locking cam, or may include a pair of synchronized locking cams 220 as shown. For example, the locking cam link 240 may be rotatably attached to the locking cams 220 and may maintain rotational and positional synchronization between the locking cams 220.

The buckle strap 120 includes buckle strap stop blocks 260, which may engage with the locking cams 220 to prevent clockwise over-rotation, such as rotation clockwise from the orientation shown in FIG. 2. Although rotation is described herein as clockwise and counterclockwise respectively, rotation may refer to a first rotational direction, which may differ from clockwise rotation, and counterclockwise may refer to a second rotational direction opposite the first rotational direction, which may differ from counterclockwise rotation.

The locking cam springs 230 are attached to the locking cams 220, and may apply a counterclockwise rotational force to bias the locking cams 220 in the counterclockwise direction, which may maintain engagement between the locking cams 220 and the buckle base bracket stops 134 as shown or the respective stop surface 136S of the buckle base bracket ramp stops 136 (not shown in FIG. 2), which may prevent the buckle strap 120 from moving in the second linear direction (extension). The rotational position of the locking cams 220 shown in FIG. 2, such that that locking cams 220 engage with the stop surface 136S of a respective the buckle base bracket ramp stops 136 or with the buckle base bracket stops 134 may be referred to herein as the locking position.

Figure 3:
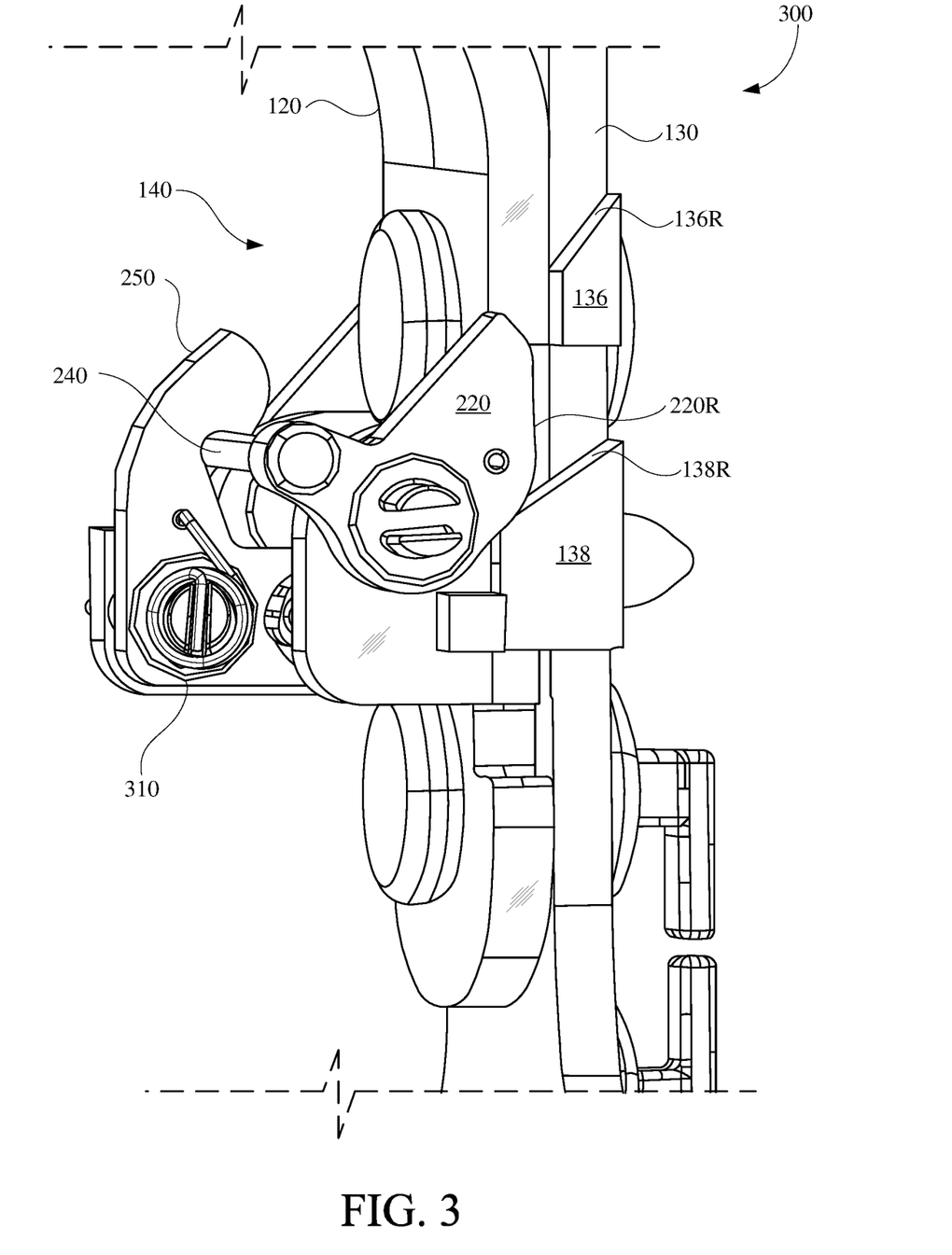
FIG. 3 is a rear perspective view of an example of a portion of the buckle assembly including the position locking unit shown in FIG. 1 in accordance with implementations of this disclosure.

FIG. 3 is a rear perspective view of an example of a portion 300 of the buckle assembly 100 including the position locking unit 140 shown in FIG. 1 in accordance with implementations of this disclosure. In FIG. 3, the buckle strap 120 and the position locking unit 140 are shown in, or proximal to, the reset position. The compression spring 160 and the locking cam springs 230 are omitted from FIG. 3 for clarity.

In response to a compressing force applied to the buckle head 110 (not shown), a locking cam riding surface 220R of the locking cams 220 may engage with the ramp surface 138R of respective buckle base bracket reset ramps 138. Engagement of the locking cam riding surface 220R of the locking cams 220 with the ramp surface 138R of respective buckle base bracket reset ramps 138 responsive to the compressive force may rotate the locking cams 220 counterclockwise. For example, the locking cams 220 may rotate into a transition position. The locking cam springs 230 may apply a counter rotation force, clockwise, to the locking cams 220.

Engagement of the locking cam riding surface 220R of the locking cams 220 with the ramp surface 138R of respective buckle base bracket reset ramps 138 responsive to the compressive force into the reset position may over-rotate the locking cams 220 counterclockwise. In response to counterclockwise over-rotation of the locking cams 220, the locking cam link 240 may engage with the locking cam lock 250. The locking cam lock 250 may include a locking cam lock spring 310 which may apply a clockwise rotational force to bias the locking cam lock 250 in the clockwise direction, which may maintain engagement between the locking cam lock 250 and the locking cam link 240, which may prevent rotation, such as clockwise rotation, counterclockwise rotation, or both, of the locking cams 220, which may be referred to herein as the locked out, or disengaged, position. In the disengaged position, the locking cams 220 may be prevented from engaging with the buckle base bracket ramp stops 136 and the buckle base bracket reset ramps 138.

In response to a cessation, removal, or discontinuation of the compressing force, the compression spring 160 (not shown) may apply an extending force, moving the buckle head 110 (not shown), the buckle strap 120, and the position locking unit 140 along the buckle base bracket 130 to the extended position (as shown in FIGS. 1 and 2).

Although not shown in FIG. 3, the buckle assembly 100 may be in the extended position or an intermediate position (other than the intermediate position proximal to the buckle base bracket reset ramps 138) and in response to a compressing force (compression) applied to the buckle head 110 (not shown), the locking cam riding surface 220R of the locking cams 220 may move in the first linear direction (compression) and may engage with the ramp surface 136R of respective buckle base bracket ramp stops 136.

Engagement of the locking cam riding surface 220R of the locking cams 220 with the ramp surface 136R of respective buckle base bracket ramp stops 136 responsive to compression may rotate the locking cams 220 counterclockwise.

The amount or degree of counterclockwise rotation of the locking cams 220 corresponding to engaging with the buckle base bracket reset ramps 138 may exceed (greater than) the amount or degree of counterclockwise rotation of the locking cams 220 corresponding to engaging with respective buckle base bracket ramp stops 136 such that engagement of the locking cam lock 250 with the locking cam link 240 into the disengaged position may be omitted in response to the locking cams 220 engaging with respective buckle base bracket ramp stops 136.

In response to further compression, the locking cams 220 may clear (move below) the respective buckle base bracket reset ramps 138 and the locking cam springs 230 may apply a counter rotation force, clockwise, to the locking cams 220, and the locking cams 220 may rotate into locking position, which may be similar to the locking position shown in FIGS. 1 and 2, relative to the respective buckle base bracket reset ramps 138.

In response to a cessation, removal, or discontinuation of the compressing force, the compression spring 160 (not shown) may apply an extending force, moving the buckle head 110 (not shown), the buckle strap 120, and the position locking unit 140 along the buckle base bracket 130 such that the locking cams 220 engage with engage with the stop surface 136S of a respective the buckle base bracket ramp stops 136 or with the buckle base bracket stops 134 and lock in the respective position.

For example, the buckle assembly 100 may be in the extended position and compression may be applied to move the buckle head 110 (not shown), the buckle strap 120, and the position locking unit 140 in the first linear direction (compression) along the buckle base bracket 130 to the first intermediate position, the compressive force may be removed and the buckle assembly 100 may lock in the first intermediate position. A second compression may be applied to move the buckle head 110 (not shown), the buckle strap 120, and the position locking unit 140 along the buckle base bracket 130 in the first linear direction (compression) to the second intermediate position, the second compressive force may be removed and the buckle assembly 100 may lock in the second intermediate position. A third compression may be applied to move the buckle head 110 (not shown), the buckle strap 120, and the position locking unit 140 along the buckle base bracket 130 in the first linear direction (compression) to the third intermediate position, the third compressive force may be removed and the buckle assembly 100 may lock in the third intermediate position. A fourth compression may be applied to move the buckle head 110 (not shown), the buckle strap 120, and the position locking unit 140 along the buckle base bracket 130 in the first linear direction (compression) to the reset position, the fourth compressive force may be removed, and the buckle assembly 100 may move in the second linear direction (extension) to the extended position responsive to the compression spring 160.

Figure 4:
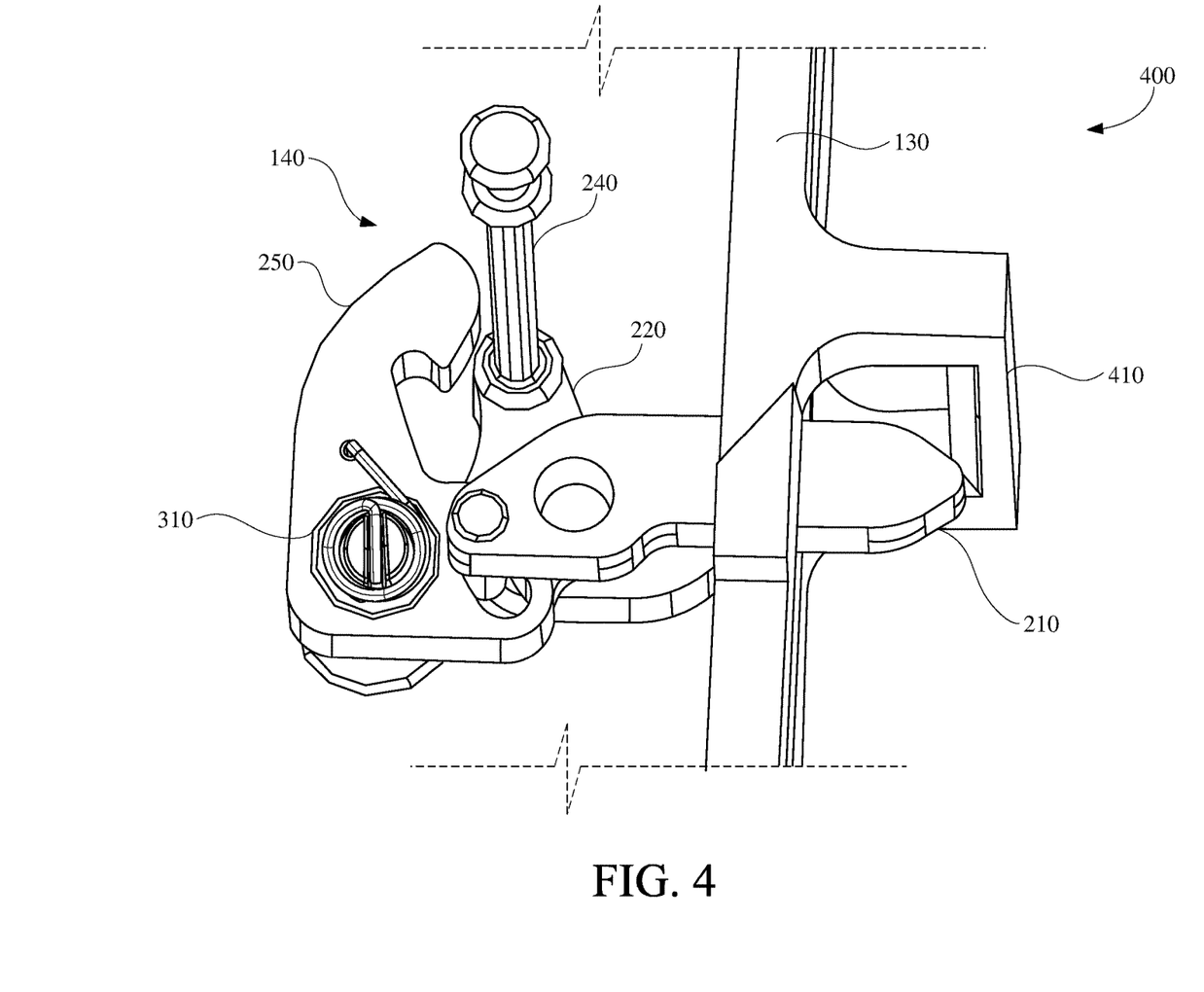
FIG. 4 is an expanded view of an example of a portion of the buckle assembly including the position locking unit shown in FIG. 1 in accordance with implementations of this disclosure.

FIG. 4 is an expanded view of an example of a portion 400 of the buckle assembly 100 including the position locking unit 140 shown in FIG. 1 in accordance with implementations of this disclosure. In FIG. 4, some elements of the buckle assembly 100, such as the proximal locking cam 220, the proximal locking cam spring 230, and the buckle strap 120, are omitted for clarity.

The buckle base bracket 130 may include a buckle base bracket unlock ramp 410. The reset link 210 may be movable within a cavity of the position locking unit 140. In response to an extending force, such as an extending force applied by the compression spring 160 (not shown), moving the buckle head 110 (not shown), the buckle strap 120 (not shown), and the position locking unit 140 in the second linear direction (extension), the reset link 210 may engage the buckle base bracket unlock ramp 410, which may rotate the reset link 210 clockwise, which may apply a force to the locking cam lock 250, which may disengage the locking cam lock 250 from the locking cam link 240, and the locking cam springs 230 may apply a clockwise rotation force to the locking cams 220, which may reset the locking cams 220 to the locking position.

The buckle strap 120 can be reset to a fully extended position by applying a force to the buckle head until the buckle strap 120 has engaged the reset ramp stops 136. In response to engagement of the reset ramp stops 136, a force may be applied to the buckle head in the second direction (extension), e.g., an upward direction, such as by the compression spring 160 such that the buckle strap 120 is reset to the extended position.

Figure 5:
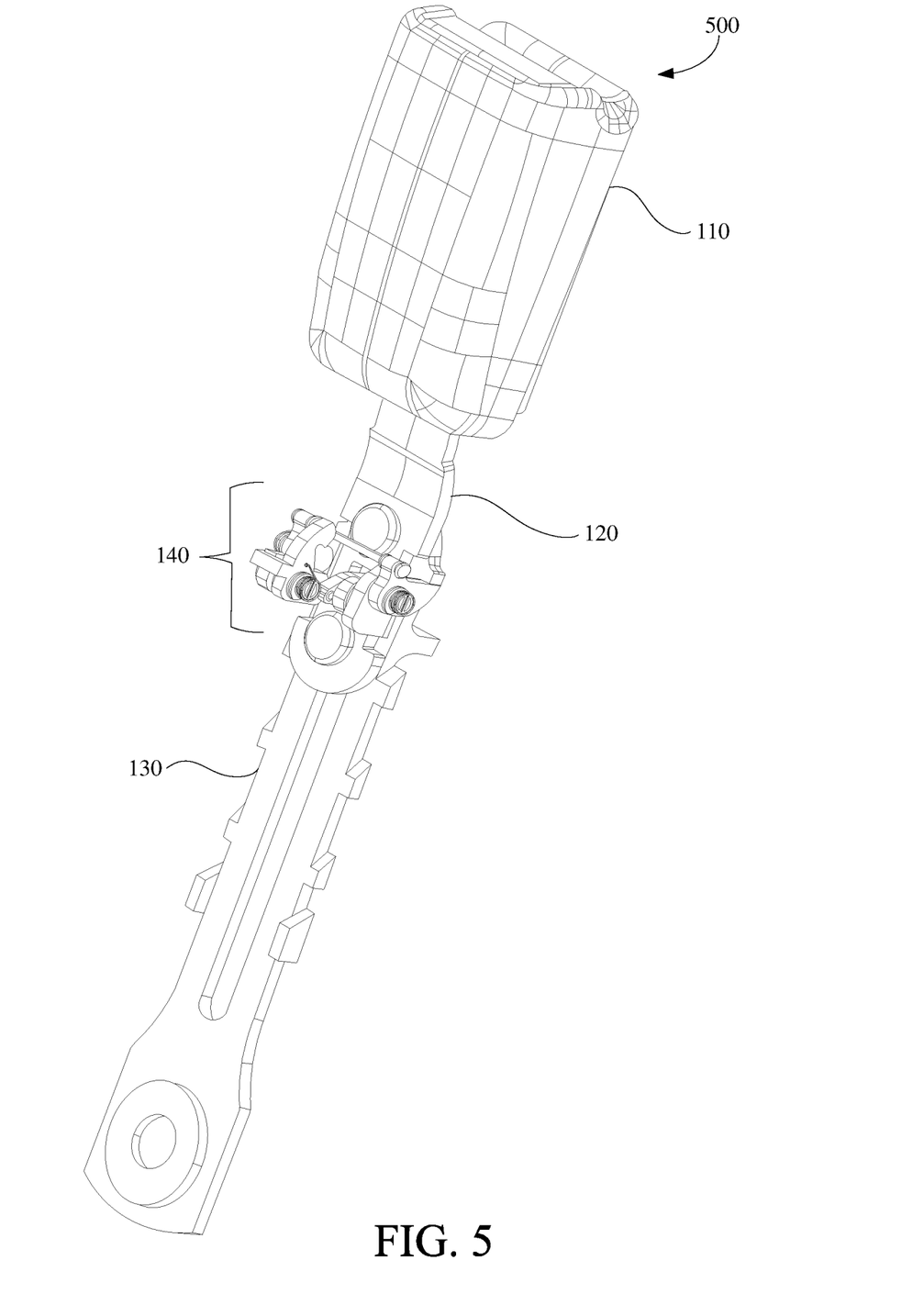
FIG. 5 is a front isometric view of an example of the buckle assembly shown in FIG. 1 in the extended position in accordance with implementations of this disclosure.

FIG. 5 is a front isometric view of an example of the buckle assembly 100 shown in FIG. 1 in the extended position in accordance with implementations of this disclosure. As shown, the buckle assembly includes the buckle base bracket 130, and the buckle head 110, the buckle strap 120, and the position locking unit 140 in the extended position.

Figure 6:
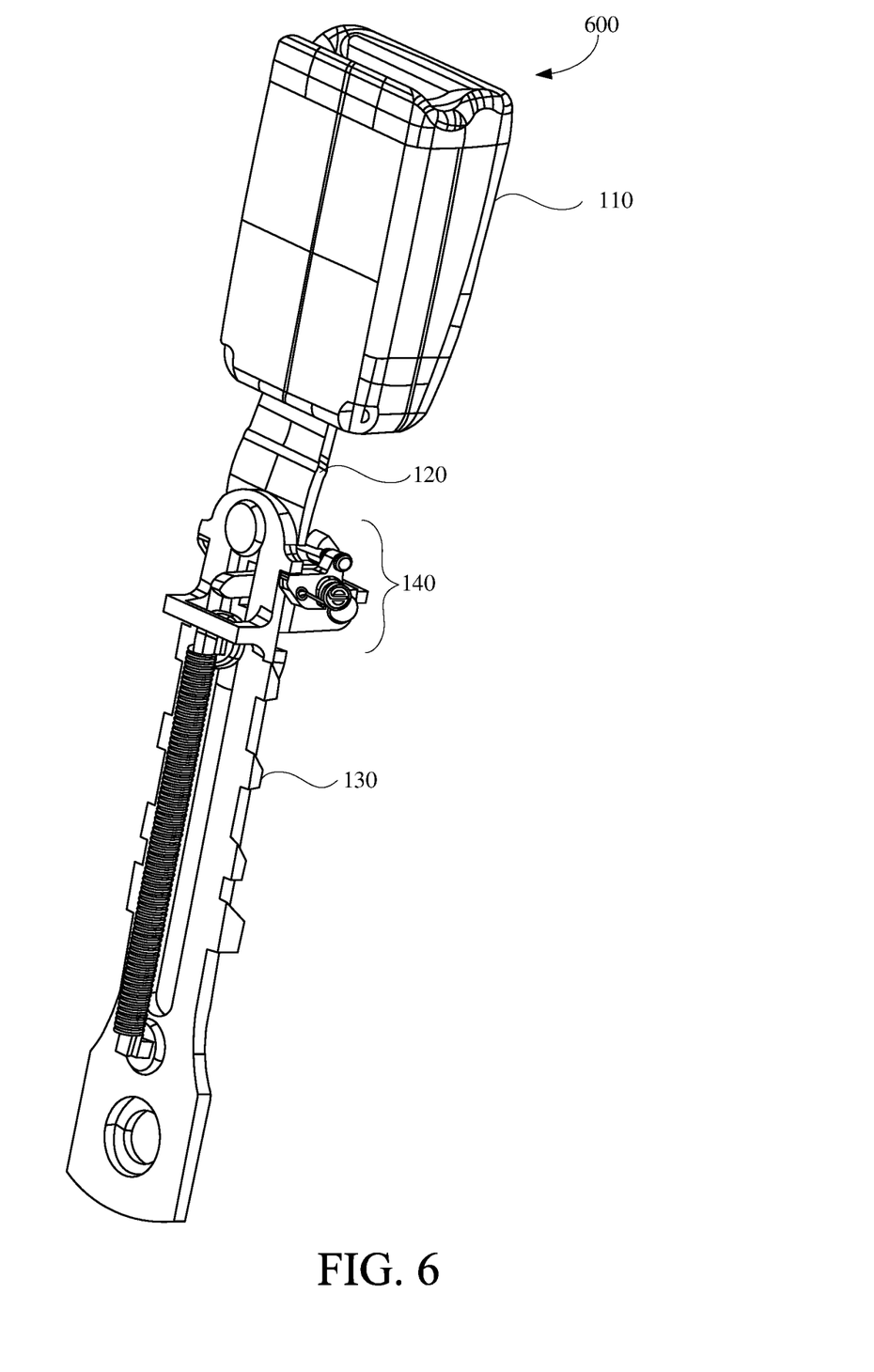
FIG. 6 is a rear isometric view of an example of the buckle assembly shown in FIG. 1 in the extended position in accordance with implementations of this disclosure.

FIG. 6 is a rear isometric view of the buckle assembly 100 shown in FIG. 1 in the extended position in accordance with implementations of this disclosure. As shown, the buckle assembly includes the buckle base bracket 130, and the buckle head 110, the buckle strap 120, and the position locking unit 140 in the extended position.

The buckle strap 120 can be retracted, i.e., positionally adjusted in the first direction, such as by a user applying a downward (compressive) force to the buckle head 110, which forces the buckle strap 120 to move in the first direction, e.g., a downward direction. The force may be applied to the buckle head 110 to adjust the buckle assembly 100 in the first direction.

Figure 7:
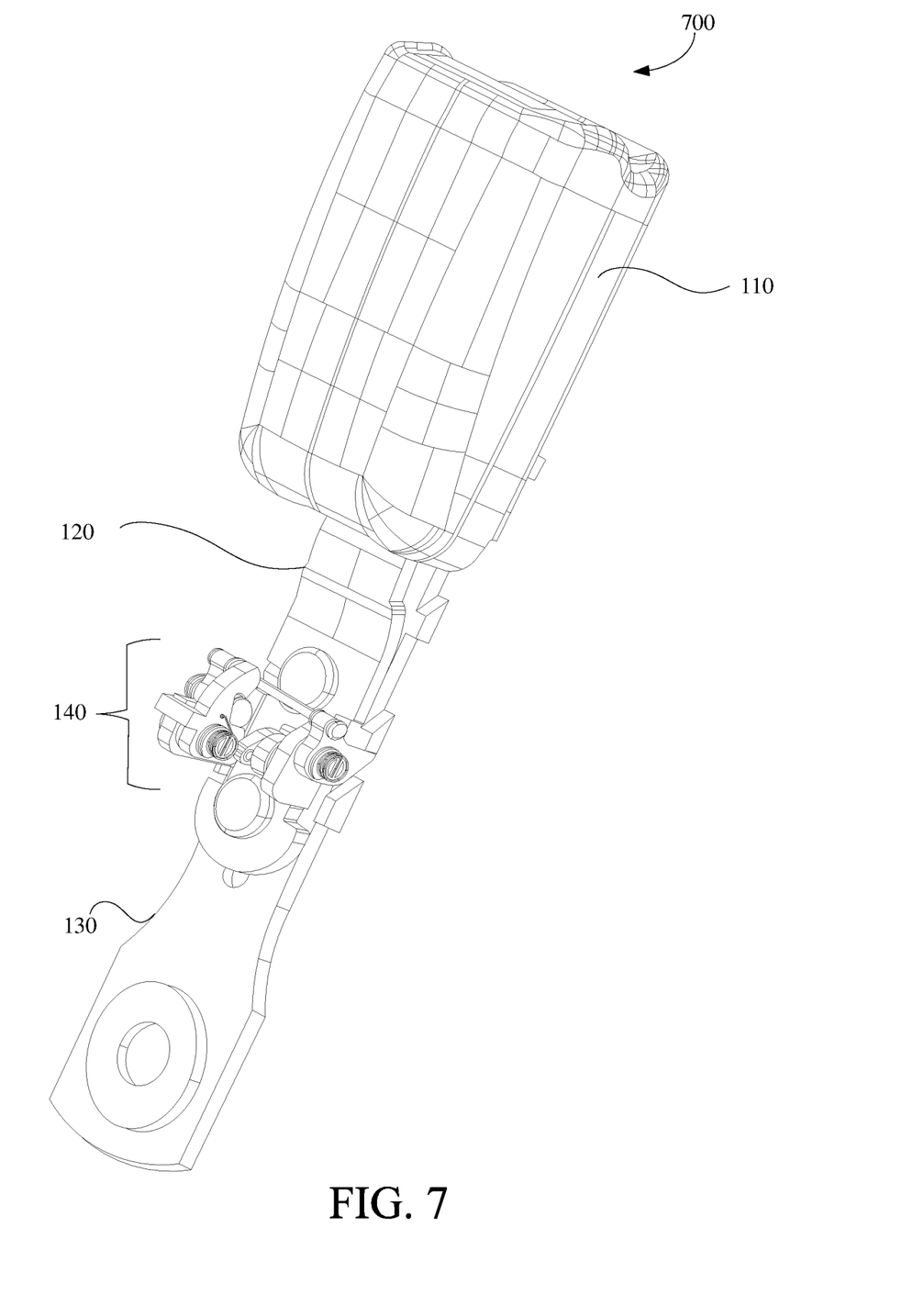
FIG. 7 is a front isometric view of an example of the buckle assembly shown in FIG. 1 in the intermediate position proximal to the reset position shown in FIG. 3 in accordance with implementations of this disclosure.

FIG. 7 is a front isometric view of an example of the buckle assembly 100 shown in FIG. 1 in the intermediate position proximal to the reset position shown in FIG. 3 in accordance with implementations of this disclosure. As shown, the buckle assembly includes the buckle base bracket 130, and the buckle head 110, the buckle strap 120, and the position locking unit 140 in the intermediate position proximal to the reset position.

Figure 8:
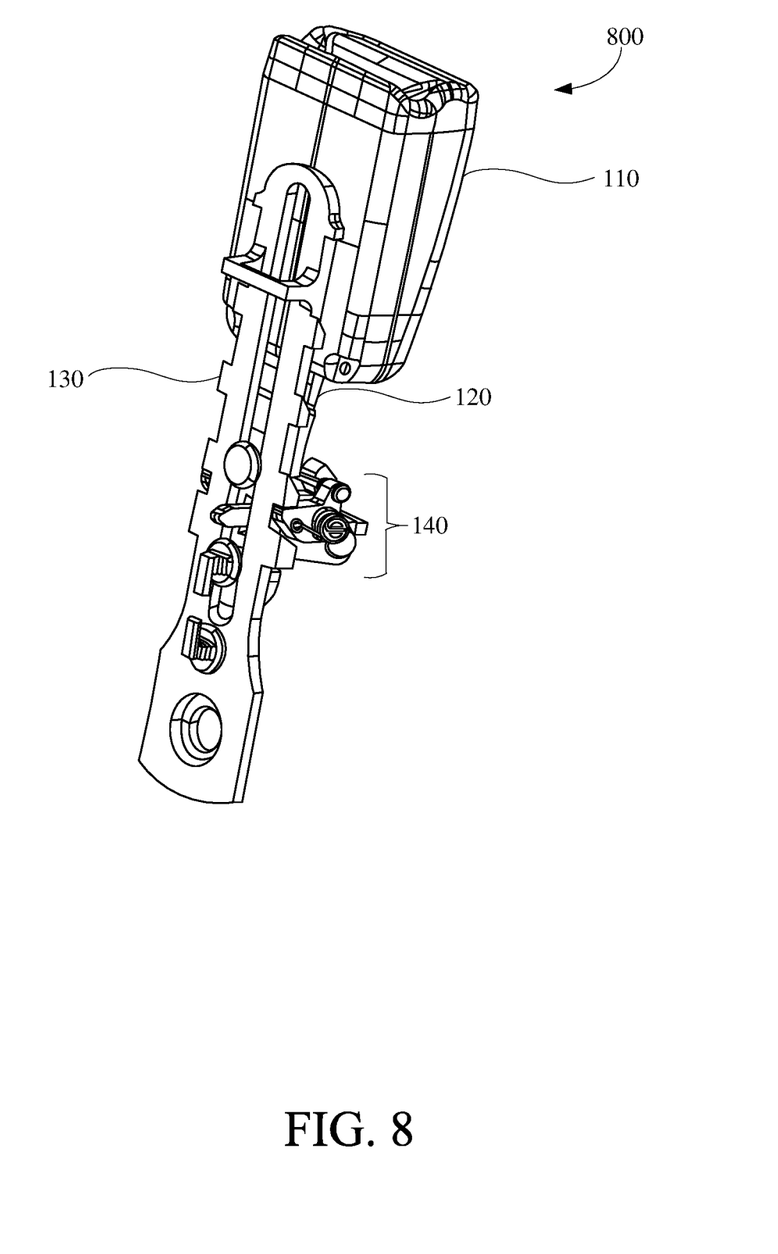
FIG. 8 is a rear isometric view of an example of the buckle assembly shown in FIG. 1 in the intermediate position proximal to the reset position shown in FIG. 3 in accordance with implementations of this disclosure.

FIG. 8 is a rear isometric view of an example of the buckle assembly 100 shown in FIG. 1 in the intermediate position proximal to the reset position shown in FIG. 3 in accordance with implementations of this disclosure. As shown, the buckle assembly includes the buckle base bracket 130, and the buckle head 110, the buckle strap 120, and the position locking unit 140 in the intermediate position proximal to the reset position.

Figure 9:
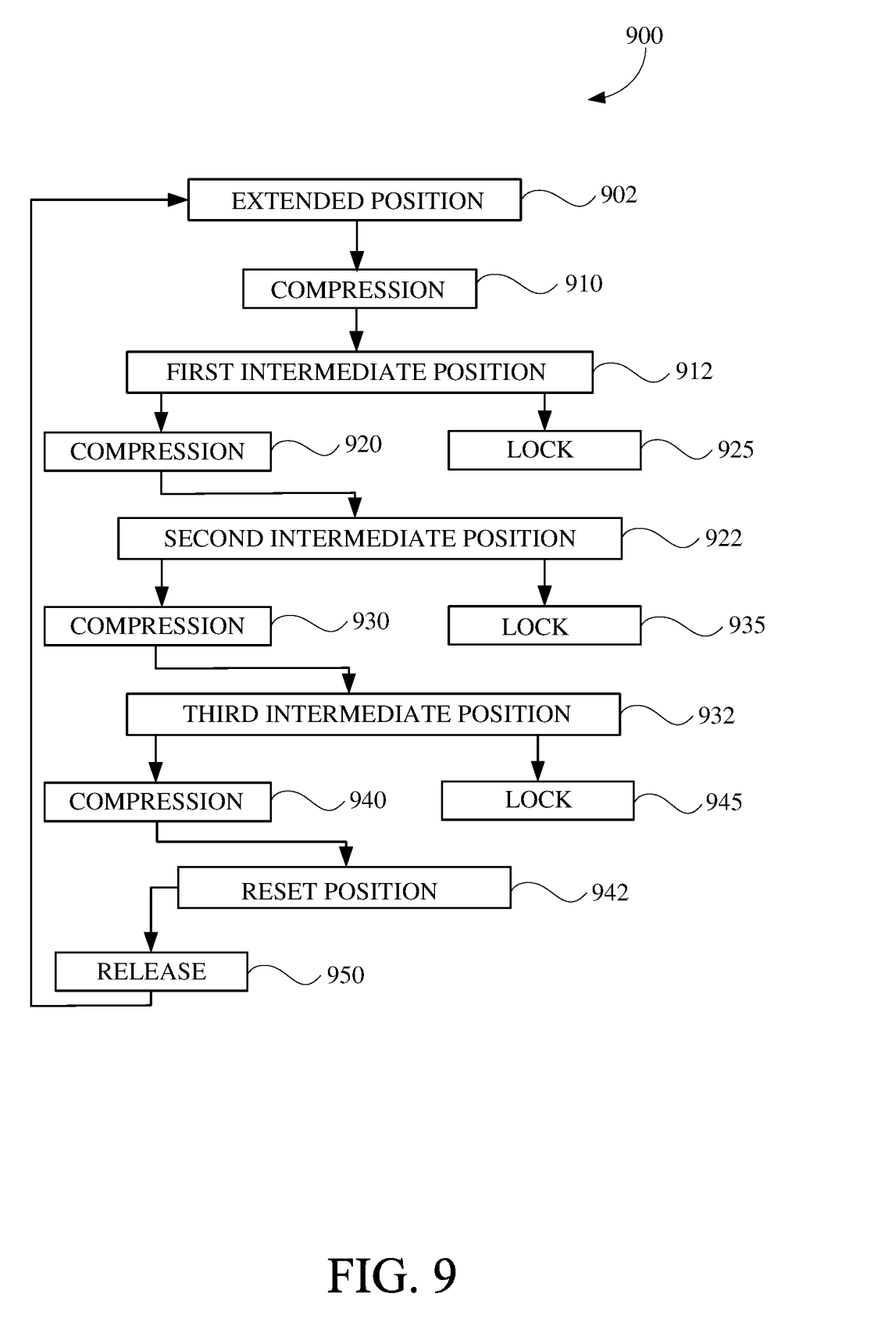
FIG. 9 is a flow diagram of an example of a method of adjusting the buckle assembly shown in FIG. 1 in accordance with implementations of this disclosure.

FIG. 9 is a flow diagram of an example of a method 900 of adjusting a buckle assembly, such as the buckle assembly 100 shown in FIG. 1, in accordance with implementations of this disclosure.

Adjusting the buckle assembly may include applying a downward (compressive) force to the buckle head of the buckle assembly at 910. For example, the buckle assembly may be in the extended position 902, such as shown in FIGS. 5 and 6, and the compressive force may be applied to move the buckle head, the buckle strap, and the position locking unit downward in a first linear direction (compression). In response to the compression applied at 910, the buckle head, the buckle strap, and the position locking unit may move downward in the first linear direction to the first intermediate position 912.

Adjusting the buckle assembly may include applying a downward (compressive) force to the buckle head of the buckle assembly at 920 to move the buckle head, the buckle strap, and the position locking unit downward in the first linear direction past the first intermediate position 912. In response to the compression applied at 920, the buckle head, the buckle strap, and the position locking unit may move downward in the first linear direction to the second intermediate position 922. Compression past the first intermediate position 912 may be omitted or ceased and the buckle assembly may lock at 925 in the first intermediate position 912.

Adjusting the buckle assembly may include applying a downward (compressive) force to the buckle head of the buckle assembly at 930 to move the buckle head, the buckle strap, and the position locking unit downward in the first linear direction past the second intermediate position 922. In response to the compression applied at 930, the buckle head, the buckle strap, and the position locking unit may move downward in the first linear direction to the third intermediate position 932. Compression past the second intermediate position 922 may be omitted or ceased and the buckle assembly may lock at 935 in the second intermediate position 922.

Adjusting the buckle assembly may include applying a downward (compressive) force to the buckle head of the buckle assembly at 940 to move the buckle head, the buckle strap, and the position locking unit downward in the first linear direction past the third intermediate position 932 to the reset position 942. Compression past the third intermediate position 932 may be omitted or ceased and the buckle assembly may lock at 945 in the third intermediate position 932.

Adjusting the buckle assembly may include ceasing or releasing the downward (compressive) force at 950. In response to ceasing or releasing the downward force at 950 the buckle head, the buckle strap, and the position locking unit may move upward (extension) to the extended position 902.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A buckle assembly comprising:
   a buckle base bracket including at least one buckle base bracket ramp stop and at least one buckle base bracket reset ramp; and
   a buckle adjustment assembly, the buckle adjustment assembly including:
      a buckle strap coupled to the buckle base bracket such that the buckle adjustment assembly is capable of moving linearly along the buckle base bracket between an extended position, at least one intermediary position, and a reset position;
      a buckle head attached to the buckle strap, such that a proximal end of the buckle base bracket is proximal to the buckle head and a distal end of the buckle base bracket is distal from the buckle head; and
      a position locking unit coupled to the buckle strap, the position locking unit including a locking cam configured to:
         engage with a stop surface of the buckle base bracket ramp stop to prevent the buckle adjustment assembly from moving in a first linear direction toward the proximal end of the buckle base bracket;
         engage with a ramp surface of the buckle base bracket ramp stop to rotate the locking cam such that the buckle adjustment assembly is movable in a second linear direction toward the distal end of the buckle base bracket; and
         engage with a ramp surface of the buckle base bracket reset ramp to over-rotate the locking cam into a disengaged position such that the buckle adjustment assembly is movable in the first linear direction;
         wherein the position locking unit includes a locking cam lock to retain the locking cam in the disengaged position.

2. The buckle assembly of claim 1, wherein:
   the buckle base bracket includes a buckle base bracket unlock ramp proximal to the proximal end of the buckle base bracket; and
   the position locking unit includes a reset link, coupled to the locking cam lock, wherein in response to movement of the buckle adjustment assembly to the extended position, the reset link engages with the buckle base bracket unlock ramp and disengages the locking cam lock such that the locking cam rotates into a locking position.

3. The buckle assembly of claim 1, wherein the buckle base bracket includes the buckle base bracket ramp stop as one of a plurality of buckle base bracket ramp stops, wherein each buckle base bracket ramp stop from the plurality of buckle base bracket ramp stops corresponds with a respective intermediate adjustment position of the buckle adjustment assembly between the extended position and the reset position.

4. The buckle assembly of claim 1, wherein:
   the locking cam includes a locking cam spring that biases the locking cam to rotate the locking cam in a first rotational direction;
   the locking cam is configured to engage with the ramp surface of the buckle base bracket ramp stop to rotate the locking cam in a second rotational direction opposite the first rotational direction; and
   the locking cam is configured to engage with the ramp surface of the buckle base bracket reset ramp to over-rotate the locking cam in the second rotational direction.

5. The buckle assembly of claim 1, further comprising a compression spring, wherein:
   the buckle base bracket includes a buckle base bracket rivet proximal to the distal end of the buckle base bracket;
   the buckle strap is coupled to the buckle base bracket using a buckle strap rivet; and
   the compression spring engages with the buckle base bracket rivet and the buckle strap rivet to bias the buckle adjustment assembly toward the extended position.

6. The buckle assembly of claim 1, wherein buckle base bracket is attached to a vehicle at the distal end of the buckle base bracket.

7. A method for adjusting a buckle assembly comprising:
   applying a compressing force to a buckle adjustment assembly of a buckle assembly to move the buckle adjustment assembly to an adjustment position, wherein the adjustment position is an extended adjustment position, an intermediate adjustment position, or a reset adjustment position, and wherein the buckle assembly includes:
      a buckle base bracket including at least one buckle base bracket ramp stop and at least one buckle base bracket reset ramp; and
      the buckle adjustment assembly, the buckle adjustment assembly including:
         a buckle strap coupled to the buckle base bracket such that the buckle adjustment assembly is capable of moving linearly along the buckle base bracket to the extended adjustment position, the intermediate adjustment position, and the reset adjustment position;
         a buckle head attached to the buckle strap, such that a first end of the buckle base bracket is proximal to the buckle head and a second end of the buckle base bracket is distal from the buckle head; and
         a position locking unit coupled to the buckle strap, the position locking unit including a locking cam configured to:
            engage with a stop surface of the buckle base bracket ramp stop to prevent the buckle adjustment assembly from moving in a first linear direction toward the first end of the buckle base bracket;
            engage with a ramp surface of the buckle base bracket ramp stop to rotate the locking cam such that the buckle adjustment assembly is movable in a second linear direction toward the second end of the buckle base bracket; and engage with a ramp surface of the buckle base bracket reset ramp to over-rotate the locking cam into a disengaged position such that the buckle adjustment assembly is movable in the first linear direction; and removing the compressing force from the buckle adjustment assembly to lock the buckle adjustment assembly in a target adjustment position.

8. The method of claim 7, wherein applying the compressing force includes applying the compressing force in the second linear direction.

9. The method of claim 7, wherein:

the buckle base bracket includes a buckle base bracket rivet proximal to the second end of the buckle base bracket;

the buckle strap is coupled to the buckle base bracket using a buckle strap rivet;

the buckle assembly includes a compression spring that engages with the buckle base bracket rivet and the buckle strap rivet to bias the buckle adjustment assembly toward the extended position;

applying the compressing force includes applying the compressing force to move the buckle adjustment assembly to the reset adjustment position, such that the locking cam engages with the ramp surface of the buckle base bracket reset ramp to over-rotate the locking cam into the disengaged position; and removing the compressing force includes removing the compressing force such that the compression spring moves the buckle adjustment assembly to the extended adjustment position.

10. The method of claim 7, wherein:

applying the compressing force includes applying the compressing force to move the buckle adjustment assembly in the second linear direction, such that:

the locking cam engages with the ramp surface of the buckle base bracket ramp stop and rotates into a transition position such that the buckle adjustment assembly is movable in the second linear direction to the intermediate adjustment position; and on a condition that a maximum distance of the locking cam from the second end of the buckle base bracket exceeds a distance of the stop surface of the buckle base bracket ramp stop from the second end of the buckle base bracket, the locking cam rotates into the locking position; and removing the compressing force includes removing the compressing force such that the locking cam engages with the stop surface of the buckle base bracket ramp stop and prevents the buckle adjustment assembly from moving in the first linear direction.

11. The method of claim 7, wherein removing the compressing force from the buckle adjustment assembly to lock the buckle adjustment assembly in the target adjustment position includes removing the compressing force from the buckle adjustment assembly to lock the buckle adjustment assembly in the intermediate adjustment position, and wherein:

the buckle base bracket includes a plurality of buckle base bracket ramp stops;

each buckle base bracket ramp stop from the plurality of buckle base bracket ramp stops corresponds with a respective intermediate adjustment position of the buckle adjustment assembly between the extended position and the reset position;

the plurality of buckle base bracket ramp stops includes the buckle base bracket ramp stop as a first buckle base bracket ramp stop corresponding to a first intermediate adjustment position; and the plurality of buckle base bracket ramp stops includes a second buckle base bracket ramp stop corresponding to a second intermediate adjustment position, between the first intermediate adjustment position and the reset adjustment position.

12. The method of claim 11, further comprising:

applying a second compressing force to the buckle adjustment assembly of the buckle assembly to move the buckle adjustment assembly to the second intermediate adjustment position; and removing the second compressing force from the buckle adjustment assembly to lock the buckle adjustment assembly in the second intermediate adjustment position.

13. A vehicle comprising:

a buckle base bracket attached to the vehicle at a first end of the buckle base bracket, the buckle base bracket including a buckle base bracket rivet proximal to the first end of the buckle base bracket;

a buckle adjustment assembly coupled to the buckle base bracket such that the buckle adjustment assembly is capable of moving linearly along the buckle base bracket to each adjustment position from a plurality of adjustment positions between the first end of the buckle base bracket and a second end of the buckle base bracket, the buckle adjustment assembly including:

a buckle strap coupled to the buckle base bracket using a buckle strap rivet;

a buckle head attached to the buckle strap, such that the second end of the buckle base bracket is proximal to the buckle head and the first end of the buckle base bracket is distal from the buckle head; and a position locking unit coupled to the buckle strap, the position locking unit including:

a locking cam; and a locking cam lock to retain the locking cam in the disengaged position; and a compression spring, wherein the compression spring engages with the buckle base bracket rivet and the buckle strap rivet to bias the buckle adjustment assembly toward the first end of the buckle base bracket.

14. The vehicle of claim 13, wherein:

the buckle base bracket includes:

a buckle base bracket reset ramp; and buckle base bracket ramp stops; and the plurality of adjustment positions includes:

a reset adjustment position corresponding to the buckle base bracket reset ramp and proximate to the first end of the buckle base bracket;

an extended adjustment position between a second end of the buckle base bracket and the reset adjustment position; and intermediate adjustment positions between the reset adjustment position and the extended adjustment position, wherein each intermediate adjustment position from the intermediate adjustment positions corresponds with a respective buckle base bracket ramp stop from the buckle base bracket ramp stops.

15. The vehicle of claim 14, wherein:

on a condition that the locking cam lock is disengaged, the position locking unit is configured to engage the locking cam to prevent the buckle adjustment assembly from moving towards the second end of the buckle base bracket; and on a condition that the locking cam lock is engaged, the compression spring is configured to move the buckle adjustment assembly to the extended adjustment position.

16. The vehicle of claim 15, wherein:

the buckle base bracket includes a buckle base bracket unlock ramp proximal to the extended adjustment position;

the position locking unit includes a reset link coupled to the locking cam lock; and the compression spring is configured to move the buckle adjustment assembly to the extended adjustment position such that the reset link engages with the buckle base bracket unlock ramp and disengages the locking cam lock such that the locking cam rotates into a locking position.

17. The vehicle of claim 16, wherein:

the position locking unit includes a locking cam spring that biases the locking cam to rotate the locking cam in a first rotational direction to engage the locking cam;

the locking cam is configured to engage with a ramp surface of the buckle base bracket ramp stop to rotate the locking cam in a second rotational direction opposite the first rotational direction; and the locking cam is configured to engage with a ramp surface of the buckle base bracket reset ramp to over-rotate the locking cam in the second rotational direction to engage the locking cam lock.

18. The vehicle of claim 17, wherein:

the position locking unit includes a locking cam lock spring that biases the locking cam lock to rotate the locking cam in the first rotational direction to engage the locking cam lock.

\* \* \* \* \*